US012753591B2

(12) United States Patent
Dahan et al.

(10) Patent No.: US 12,753,591 B2
(45) Date of Patent: Oct. 6, 2026

(54) FAUCET SYSTEM

(71) Applicant: UNITO SMART TECHNOLOGIES LIMITED, Tsuen Wan NT (HK)

(72) Inventors: Yuval-Yoni Dahan, Rishon LeTzion (IL); Abraham Dahan, Rishon LeTzion (IL)

(73) Assignee: UNITO SMART TECHNOLOGIES LIMITED, Tsuen Wan NT (HK)

( * ) Notice: Subject to any disclaimer, the term of this patent is extended or adjusted under 35 U.S.C. 154(b) by 327 days.

(21) Appl. No.: 18/138,401

(22) Filed: Apr. 24, 2023

(65) Prior Publication Data

US 2023/0340765 A1 Oct. 26, 2023

(30) Foreign Application Priority Data

Apr. 22, 2022 (EP) .................................... 22169508

(51) Int. Cl.
*E03C 1/04* (2006.01)
*B67D 1/00* (2006.01)
(Continued)

(52) U.S. Cl.
CPC .......... *E03C 1/0412* (2013.01); *B67D 1/0021* (2013.01); *B67D 1/004* (2013.01);
(Continued)

(58) Field of Classification Search
CPC .... E03C 2201/45; E03C 2201/40; E03C 1/04; B67D 1/0021; B67D 1/0078; B67D 1/0888; B67D 1/004; B67D 1/06
(Continued)

(56) References Cited

U.S. PATENT DOCUMENTS 10,183,871 B2 * 1/2019 Ye .......................... E03C 1/023
11,584,630 B2 * 2/2023 Funke .................. A47J 31/465
(Continued)

FOREIGN PATENT DOCUMENTS

CA 3000484 A1 * 4/2017 .......... B67D 1/0039
EP 3533937 A2 9/2019
(Continued)

OTHER PUBLICATIONS

European Application No. 22169508.3, Extended European Search Report mailed Sep. 29, 2022, 9 pages.

*Primary Examiner* — David P Angwin
(74) *Attorney, Agent, or Firm* — Kilpatrick Townsend & Stockton LLP

(57) ABSTRACT

A faucet system comprises a first user interface connected to a first valve, a first inlet conduit and/or a second inlet conduit, and a first outlet conduit, and a second user interface connected to a second valve, a third inlet conduit, and a second outlet conduit. The second valve is operated by a selection unit that outputs an electrical signal. A third user interface is connected to an electrically operated pump that conveys liquid via a fourth inlet conduit upstream of the pump to a third outlet conduit downstream of the pump. The third user interface comprises an input unit that outputs an electrical signal based on which the pump is operated with respect to the conveying rate and/or the operation time of the pump. Each selection possibility of the input unit is associated to a different electrical signal. A liquid additive is supplied via the fourth inlet conduit.

20 Claims, 2 Drawing Sheets

(51) Int. Cl.
*B67D 1/08* (2006.01)
*E03C 1/02* (2006.01)
*E03C 1/044* (2006.01)

(52) U.S. Cl.
CPC ............ *B67D 1/0888* (2013.01); *E03C 1/044* (2013.01); *E03C 2001/026* (2013.01); *E03C 2201/45* (2013.01)

(58) Field of Classification Search
USPC ................................ 222/129.1, 129.4, 146.1
See application file for complete search history.

(56) References Cited

U.S. PATENT DOCUMENTS

| | | | | |
|---|---|---|---|---|
| 11,753,293 | B2 * | 9/2023 | Torak | B67D 1/0003 222/1 |
| 2007/0152074 | A1 | 7/2007 | Stowe et al. | |
| 2013/0106690 | A1 * | 5/2013 | Lim | G06F 3/04886 345/173 |
| 2015/0037464 | A1 * | 2/2015 | McHale | B67D 1/0059 426/67 |
| 2017/0043992 | A1 * | 2/2017 | Green | B67D 1/0864 |
| 2018/0251361 | A1 * | 9/2018 | Wing | B67D 1/0875 |
| 2019/0270630 | A1 * | 9/2019 | Dahan | E03C 1/057 |

FOREIGN PATENT DOCUMENTS

| | | | | |
|---|---|---|---|---|
| EP | 3533937 | A3 | 11/2019 | |
| EP | 3766828 | A2 | 1/2021 | |
| EP | 3766828 | A3 | 2/2021 | |
| WO | 0029769 | A2 | 5/2000 | |
| WO | 0029769 | A3 | 8/2000 | |
| WO | 2007113663 | A2 | 10/2007 | |
| WO | 2007113663 | A3 | 1/2008 | |
| WO | 2015006588 | A1 | 1/2015 | |
| WO | 2015006588 | A9 | 4/2015 | |
| WO | WO-2018236758 | A1 * | 12/2018 | B67D 1/0888 |
| WO | 2020182700 | A1 | 9/2020 | |

* cited by examiner

FAUCET SYSTEM

CROSS REFERENCE TO RELATED APPLICATION

This application claims priority to European Patent Application No. 22 169 508.3, filed in Europe on Apr. 22, 2022, the entire contents of which are hereby incorporated herein by this reference.

TECHNICAL FIELD

This invention refers to a faucet system for delivering beverages to a user.

BACKGROUND

There are faucet systems that are capable of providing a user with a variety of beverages via a single faucet spout, such as sparkling water, boiling or chilled water, flavored water or the like. However, the selection process of a specific beverage amongst all available beverages may be quite difficult for a user.

SUMMARY

It is therefore the object of the present invention to provide a faucet system that comprises an improved usability while ensuring a desired quality of the delivered beverages.

This object is solved according to the present invention, by a faucet system for delivering beverages to a user, wherein the faucet system comprises a first user interface which is connected to a first valve fluidically connected to a first inlet conduit and/or a second inlet conduit, and a first outlet conduit, wherein the first valve is configured to selectively at least partially open or close the first inlet conduit and/or the second inlet conduit such that either fluid supplied by the first inlet conduit or fluid supplied by the second inlet conduit or a mixture of these fluids or no fluid may be fed into the first outlet conduit, wherein mains water is supplied via the first inlet conduit and the second inlet conduit,

- a second user interface which is electrically connected to at least one second valve fluidically connected to at least a third inlet conduit and a second outlet conduit, wherein the second valve is configured to selectively at least partially open or close each of the at least one inlet conduit connected thereto such that either fluid supplied by the third inlet conduit or fluid supplied by a further inlet conduit connected to the second outlet conduit or a mixture of these fluids or no fluid may be fed into the second outlet conduit, wherein the at least one second valve is operated by a user using a selection unit having multiple selection possibilities that is configured to output an electrical signal based on which the valve is operated, wherein each selection possibility of the selection unit is associated to a different electrical signal, and wherein at least one of chilled water, hot water, and carbonized water is supplied via the third inlet conduit, and
- a third user interface which is electrically connected to at least one electrically operated pump that is configured to convey liquid via at least a fourth inlet conduit upstream of the pump to a third outlet conduit downstream of the pump, wherein the third user interface comprises an input unit having multiple selection possibilities that is configured to output an electrical signal based on which the at least one pump is operated with respect to the conveying rate and/or the operation time of the pump, wherein each selection possibility of the input unit is associated to a different electrical signal, and wherein at least one liquid additive is supplied via the fourth inlet conduit.

Advantageously, the first valve may be directly operated by a user using a mechanical handle. The first valve my be a mechanical or an electrical valve. In an embodiment of the present invention, the first and second inlet conduits may merge at a point remote to the faucet and lead to the faucet as a mixed fluid via a common inlet conduit that may also be referred to as “the first inlet conduit”. In the case of a merging point of the first and second inlet conduits outside of the faucet, there is, consequently, no mixing of hot and cold mains water in the faucet. The second valve may preferably be an electrically operated valve but may, instead, also be a mechanical valve.

Especially, but not limited to this, the fluids that can be demanded using the second user interface, such as chilled water, hot water, and carbonized water, may be filtered before their supply to the spout outlet of the faucet. Preferably, these fluids are stored in respective tanks, as it is described in further detail below.

The present invention, thus, provides a faucet system with a more user-friendly interface. A user may, for example, either demand pure mains water by using the first user interface or demand one of the beverages options, for example sparkling water, by using the second interface or demand pure additive or flavored water by using solely the third interface or in combination with the second user interface (see below). Of course, it is also conceivable that a user may demand pure mains water and/or sparkling water without flavor by using the third interface. In the latter case, it may be advantageous that the first valve and/or the second valve are/is electronically controlled so that a corresponding signal from the third interface can be forwarded to the valve(s) resulting in the supply of the demanded beverage, such as pure mains water or flavored water. A respective signal may, for example, be forwarded from the corresponding user interface to a control unit. The control unit may then determine which valve and/or pump is to be activated and control an according activation.

A possible mode of interaction of a user with the faucet system according to the present invention may be as follows:

A user may use the second user interface to select and deliver pure water, e.g. chilled water. In case the user desires flavored water, the user first may select a flavor option using the third user interface, wherein the user then may optionally select a flavor type and a concentration of the flavor. Then the user may use the second user interface to select the type of beverage, such as sparking. To confirm the selection, the user may then push the second user interface axially to receive the desired beverage via the spout outlet.

The second user interface and the third user interface may each comprise a separate control unit that are suitable to communicate with each other or may be connected to a common control unit.

In the present invention, a “selection possibility” may be, for example, pure unfiltered hot mains water, pure filtered chilled sparkling water, flavored filtered boiling water or any other possible combination of available fluids that are stored at or delivered to the faucet system.

Hence, the input unit may further be configured to also output the electrical signal based on which the at least one second valve fluidically connected to the second outlet conduit is operated.

For example, the second user interface may comprise a selection knob that is rotatable around a rotation axis and that is displaceable along the rotation axis. This way, the selection knob may be rotated until a desired beverage is selected, for example sparkling water, and then pressed towards the faucet base to confirm the current selection and to demand the supply of the selected beverage. A current and/or further possible selection possibilities may be displayed to a user at the second user interface directly. Additionally or as an alternative, a current and/or further possible selection possibilities may be displayed to a user at the third user interface.

In this regard, the selection knob may be arranged on a base of a faucet, wherein preferably the selection knob is arranged next to and on the substantially the same height level as the third user interface. This may facilitate a realization of an ergonomic and intuitive user interface.

In possible embodiments of the present invention, the third user interface may comprise a display that is configured to display at least a current selection to a user. The display may present additional information, such as a selection on the second user interface, as described above, a concentration of selected mixtures for a specific beverage, a temperature of a currently selected beverage, a status of consumables connected to or comprised in the faucet system, such as of at least one tank of a flavor, a $CO_2$ tank or the like, a filter status, alerts, such as a low level alert of a tank, messages, such as a caution message informing about a hot beverage to be supplied to a user, etc.

Furthermore, the third user interface may comprise a touch screen and/or selection buttons configured to switch between and select one of the multiple available selection possibilities based on a corresponding user input. Using the touch screen and/or the selection buttons, a user may select a desired flavor/beverage. The user may then confirm a current selection by pressing a specific touch array/button or by pressing a selection button for a specific time period or by not interacting with the interface for a certain amount of time.

The mechanical handle may further be configured to adjust the flow rate of the fluid or mixture of fluids fed into the first outlet conduit. That is, by adjusting the mechanical handle the flow rate may be increased or lowered to a desired level.

It may be advantageous that each of the chilled water, the hot water, and the carbonized water may be stored in a separate tank, wherein each tank is provided with a separate second valve to which the second user interface is electrically connected, or wherein at least two of the tanks are provided with a shared second valve to which the second user interface is electrically connected, wherein each second valve fluidically leads to the second outlet conduit. Doing so, an electric signal output by the second or third user interface may be forwarded to a specific valve to separately supply fluid from an attached inlet conduit. In the case that two or more inlet conduits are connected to a shared valve, the fluids supplied via the inlet conduits may mix at the valve or the valve may be configured to only let one of the respective fluid pass selectively. By providing shared valves (for example multi-way-valves), a necessary space for and costs of the faucet system may be reduced.

The at least one liquid additive may be comprising flavor additive, health additive, such as vitamins, or a concentrated additive. An additive may be, for example, syrup, natural/artificial juice or the like.

In this respect, each liquid additive may be stored in a separate additive tank, wherein each additive tank is provided with a separate pump to which the third user interface is electrically connected, or wherein at least two of the additive tanks are provided with a shared pump to which the third user interface is electrically connected, wherein each pump fluidically leads to the third outlet conduit. The tanks may be adapted to be disconnected from the faucet system and replaced by another tank. This way, consumables, like the above-mentioned additives, may be restocked or may be replaced by a different additive, e.g. a different flavor.

At least two, in particular all three, of the first, second, and third outlet conduits may be leading to a spout of the faucet in a manner fluidically separated from each other. This can ensure that no residues of a beverage delivered at an earlier time are remaining in the faucet that might impact the quality of a desired beverage.

The first, second, and third outlet conduits may also be at least partially extendible or displaceable relative to a body of the faucet. By making the conduits displaceable out of the faucet, a so-called "pull-out faucet" can be realized having a spout outlet that is capable of being pulled closer to and object to be washed or to be supplied with the fluid delivered from the faucet.

In possible embodiments of the present invention, the third user interface may be located remotely to a faucet body and may be provided with a separate housing. For example, in the case of a third user interface being a touch screen, the touch screen may be attached to a surface, such as a wall or a kitchen top, in the vicinity of the faucet or may be a movable unit that can be freely placed at a desired location.

Additionally or as an alternative, the first user interface and/or the second user interface may also be located remotely to a faucet body and may be provided with a separate housing.

In this regard, at least one of the first user interface, the second user interface, and the third user interface may be communicating with the at least one pump wirelessly. This communication may, for example, use a Bluetooth-based protocol. As an alternative, the communication may be transmitted using a wire connection.

BRIEF DESCRIPTION OF THE DRAWINGS

The present invention is further described in greater detail with respect to an embodiment of the present invention with reference to the accompanying drawings in which.

DETAILED DESCRIPTION

Figure 1:
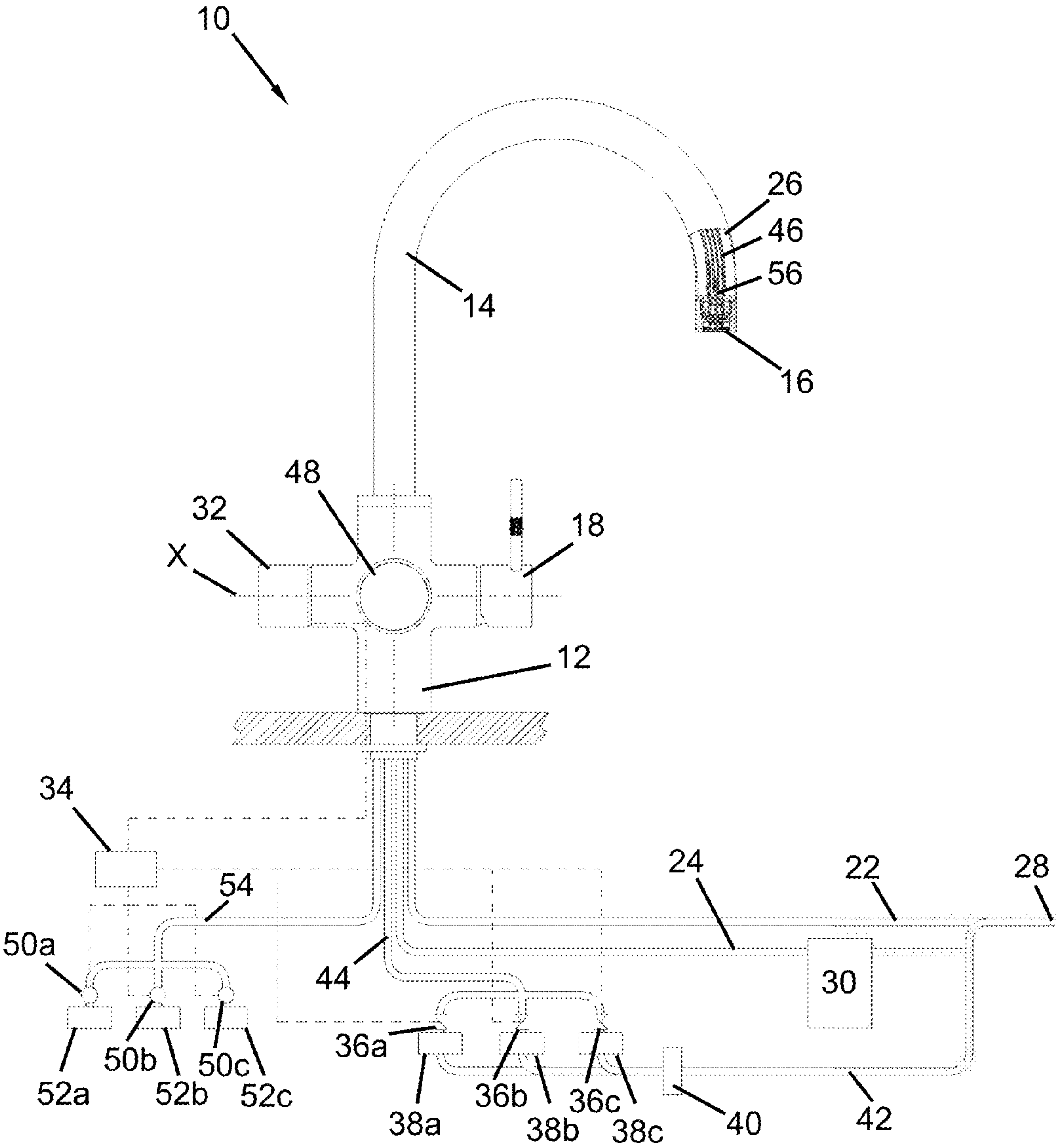
FIG. 1 shows a schematical front view of a faucet system according to the present invention.

In FIG. 1, a faucet system according to the present invention is generally denoted with the reference numeral 10. The faucet system 10 comprises a faucet base 12 and a faucet 14 which ends in an outlet spout 16 disposed at the end of the faucet 14 opposite to the faucet base 12. At the spout outlet 16, a beverage and/or pure additives can be delivered to a user of the faucet system 10.

Figure 2:
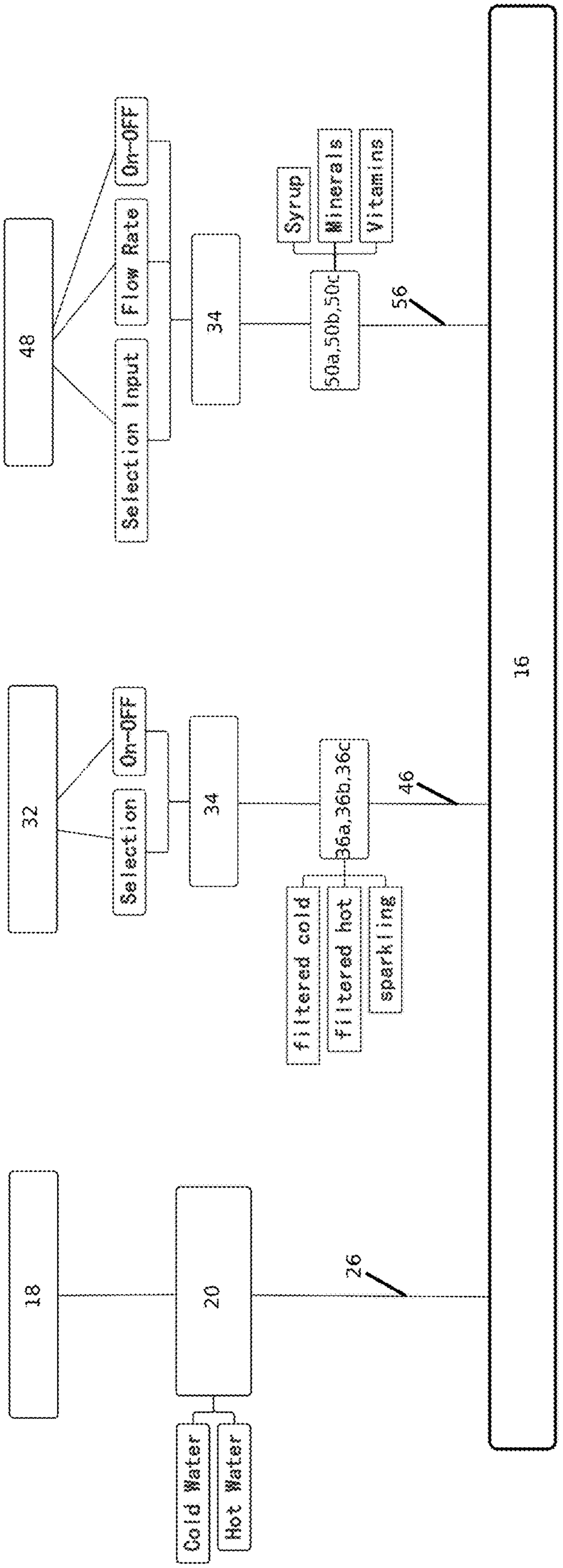
FIG. 2 shows a selection chart regarding possible interactions of a user with the faucet system.

At the faucet base 12, a mechanical handle 18 is arranged here, as a first user interface, that is adapted to manipulate a first valve 20 (see FIG. 2). The first valve 20 is fluidically connected to a first inlet conduit 22 and a second inlet conduit 24, wherein the first valve 20 is configured to selectively open or close the first and second inlet conduits 22, 24 such that either fluid supplied by the first inlet conduit 22 or fluid supplied by the second inlet conduit 24 or a mixture of these fluids is introduced into a first outlet conduit 26 that is also fluidically connected to the first valve 20, wherein the according fluid is then delivered via the spout outlet 16.

Both of the first inlet conduit 22 and the second inlet conduit 24 are connected in the shown embodiment to a water main 28. Additionally in the shown embodiment, a boiler tank 30 is installed in the second inlet conduit 24 such that water coming from the water main 28 can be heated and stored in the boiler tank 30. Thus, water at a temperature coming from the water main 28 can be delivered via the first inlet conduit 22 to the first valve 20 and water at a predetermined temperature according to the settings of the boiler tank 30 can be delivered via the second inlet conduit 24 to the first valve 20, wherein these fluids then mix in the first valve 20. Of course, it is also conceivable that the fluids from the first 22 and the second 24 inlet conduits can be mixed at a point upstream from the faucet base 12 such that only one inlet conduit is connected to the faucet base 12 conveying either the fluid from the first inlet conduit 22 or the fluid from the second inlet conduit 24 or a mixture of both. The first valve 20 may then only regulate a flow rate of the fluid supplied via the one inlet conduit.

At a side of the faucet base 12 that is diametrically opposite to the mechanical handle 18, a selection knob 32, as a second user interface, is arranged at the faucet base 12. The selection knob 32 is capable of being rotated around and displaced along an axis X, wherein it might be advantageous that the selection knob 32 comprises spring means that urge the selection knob 32 outwards with respect to the faucet base 12 into a resting position such that, after the selection knob 32 is pressed along the axis X towards the faucet base 12, the selection knob 32 automatically returns to this resting position.

In the example shown in FIG. 1, a user may rotate the selection knob 32 to select a specific beverage such as water at a specific temperature and/or whether the water shall be sparkling or not. After the user has selected the desired beverage, the selection knob 32 can be pressed along the axis X to confirm the selection. Based on this selection, an electrical signal is then output to a control unit 34 which, in turn, controls valves, in this embodiment solenoids, 36*a*, 36*b*, and 36*c*, as second valves, to selectively open or close the valves 36*a*-36*c* at least partially. Each of the valves 36*a*-36*c* is connected to a respective tank 38*a*, 38*b*, 38*c* configured to store a specific beverage, such as sparkling water, hot water and chilled water, i.e. water at a temperature below the temperature of water supplied via the water main 28. Here, the beverages stored in the tanks 38*a*-38*c* are also filtered by passing through a filter 40 that is installed in a conduit 42 connecting the tanks 38*a*-38*c* with the water main 28.

The beverage coming from at least one of the tanks 38*a*-38*c* is then supplied via a conduit 44 to the faucet base 12 and via a conduit 46 that is fluidically connected to the conduit 44 to the spout outlet 16 of the faucet system 10.

The faucet system 10, furthermore, comprises a third user interface 48 which is, in this embodiment, constituted by a touch screen having a disk shape (a circular outer edge), wherein the touch screen 48 is here arranged in the center of the faucet base 12. Additionally or as an alternative, the third user interface 48 or an additional third interface may be provided remotely from the faucet base 12 being connected to at least the control unit 34 of the faucet system 10 electrically by a respective wiring or wirelessly, for example via Bluetooth.

On the one hand, the third user interface 48 may be adapted to display at least a current selection and, advantageously, also further possible selection options that can be selected using the second user interface 32. On the other hand, the third user interface 48 may be adapted to receive a user input such as a selection of at least one additive, e.g. flavors, that a user may want to add to, for example, sparkling water.

Based on the selection performed by a user on the third user interface 48, an electric signal is forwarded to the control unit 34, wherein the control unit 34 then selectively activates at least one of pumps 50*a*, 50*b* and 50*c*, each connected to an associated additive tank 52*a*, 52*b* and 52*c*. Hence, in the example shown in FIG. 1, a user may choose between three different flavors or a mixture thereof. By activating at least one of the pumps 50*a*-50*c*, the respective additive(s) is/are supplied to the faucet base 12 via a conduit 54 and from the faucet base 12 via a conduit 56 to the spout outlet 16.

As can be seen in the partially sectional view of the spout outlet 16 and of the faucet 14 in FIG. 1, the fluids supplied via the conduits 26 and 46 are mixing within a spout end of the faucet 14, in the case that fluid is delivered via both conduits 26 and 46 at the same time, wherein the fluid(s) delivered via at least one of the conduits 26 and 46 is/are mixing with an additive delivered via the conduit 56 outside of the spout outlet 16 of the faucet 14 because the conduit 56 is extending all the way up to the spout outlet 16. Of course, for example for aesthetic reasons, the mixing of water with additive(s) may be done within the faucet 14, preferably as close to the spout outlet as possible.

FIG. 2 shows a selection scheme of a possible user interaction with the faucet system 10 and an example of possible combinations of fluids to provide a specific beverage.

Here, a user may demand hot or cold mains water, or a mixture thereof, by using the first user interface 18 such that water at a desired temperature is mixed in the first valve 20 (or at a merging point upstream thereof) and then output via the conduit 26 over the spout outlet 16. By using the second user interface 32, a user may select, in the shown example, between filtered cold water, filtered hot water, and sparkling water by rotating and pressing the selection knob 32, wherein the confirmed selection is forwarded to the control unit 34 that is configured to control the valves 36-36*c*. Based on the opening of the valves 36*a*-36*c*, at least one of filtered cold water, filtered hot water, and sparkling water is delivered via conduit 46 to the spout outlet 16. Based on user input received via the third user interface 48, different additives, in this case syrup, minerals, or vitamins, may be selected. Similar to the use of the second user interface 32, a selection performed on the third user interface 48 is forwarded to the control unit 34 that is configured to activate at least one of the pumps 50*a*-50*c* such that at least one of the available additives is supplied via the conduit 56 to the spout outlet 16. The third user interface 48 may also present at least a current mixing option of water with at least one additive. Then, by sending a signal from the third user interface 48 to the control unit 34, at least one of the valves 36*a*-36*c* and at least one of the pumps 50*a*-50*c* may be activated simultaneously.

It shall be mentioned at this point that at least one additive may be supplied via the conduit 56 and the spout outlet 16, respectively, without fluid being supplied via the other conduits 26, 46 at the same time. This way, a user may add additive(s) to an already prepared beverage.

Furthermore, a user may adjust a flow rate of at least one of the fluids supplied to the spout outlet 16 using the third user interface 48 and/or may adjust a flow rate of hot/cold mains water by using the first user interface 18.

The invention claimed is:

1. A faucet system for delivering beverages to a user, comprising:

a first user interface connected to a first valve, wherein the first valve is fluidically connected to one or more of a first inlet conduit or a second inlet conduit, wherein the first valve is fluidically connected to a first outlet conduit, and wherein the first valve is configured to selectively open or close, at least partially, one or more of the first inlet conduit or the second inlet conduit such that one of (A) fluid supplied by the first inlet conduit, (B) fluid supplied by the second inlet conduit, (C) a mixture of the fluid supplied by the first inlet conduit and the fluid supplied by the second inlet conduit, or (D) no fluid may be fed into the first outlet conduit, wherein mains water is supplied via the first inlet conduit and the second inlet conduit;

a second user interface electrically connected to at least one second valve, wherein the at least one second valve is fluidically connected to at least a third inlet conduit and a second outlet conduit, wherein the at least one second valve is configured to selectively open or close, at least partially, each of the second outlet conduit and the third inlet conduit connected to the at least one second valve such that one of: (a) fluid supplied by the third inlet conduit, (b) fluid supplied by a further inlet conduit connected to the second outlet conduit, (c) a mixture of the fluid supplied by the third inlet conduit and the fluid supplied by the further inlet conduit, or (d) no fluid may be fed into the second outlet conduit, and wherein the at least one second valve is operable using a selection unit comprising multiple selection possibilities, the selection unit configured to output an electrical signal based on which of the at least one second valve is operated, wherein each selection possibility of the selection unit is associated to a respective electrical signal, and wherein one or more of chilled water, hot water, or carbonized water is supplied via the third inlet conduit;

a third user interface electrically connected to at least one electrically operated pump, the at least one electrically operated pump configured to convey liquid via at least a fourth inlet conduit upstream of the pump to a third outlet conduit downstream of the at least one electrically operated pump, wherein the third user interface comprises an input unit having multiple selection possibilities, the input unit configured to output an electrical signal based on which of the at least one electrically operated pump is operated with respect to one or more of a conveying rate or an operation time of the pump, wherein each selection possibility of the input unit is associated to a respective electrical signal, and wherein at least one liquid additive is supplied via the fourth inlet conduit; and a faucet, wherein each of the first user interface, the second user interface, and the third user interface is arranged at a base of the faucet, and wherein:

i) the first user interface comprises a mechanical handle positioned on a first side of the base of the faucet, ii) the second user interface comprises a rotatable selection knob positioned diametrically opposite the mechanical handle on a second side of the base of the faucet; and iii) the third user interface is positioned in a center position on the base of the faucet with respect to first user interface and the second user interface.

2. The faucet system of claim 1, wherein the input unit is further configured to also output the electrical signal based on which of the at least one second valve fluidically connected to the second outlet conduit is operated.

3. The faucet system of claim 1, wherein the rotatable selection knob is rotatable around a rotation axis and displaceable along the rotation axis.

4. The faucet system, of claim 1, wherein the third user interface comprises a display that is configured to display at least a current selection.

5. The faucet system of claim 1, wherein the third user interface comprises one or more of a touch screen or selection buttons configured to switch between and select one of the multiple selection possibilities based on a corresponding user input.

6. The faucet system of claim 1, wherein the mechanical handle is configured to adjust a flow rate of the fluid or mixture of fluids fed into the first outlet conduit.

7. The faucet system of claim 1, wherein each of the chilled water, the hot water, and the carbonized water is stored in a respective separate tank;

wherein each respective separate tank is provided with a respective separate second valve to which the second user interface is electrically connected; and wherein each of the respective second valves fluidically leads to the second outlet conduit.

8. The faucet system of claim 1, wherein the at least one liquid additive comprises a flavor additive, a health additive, or a concentrated additive.

9. The faucet system of claim 1, wherein:

each liquid additive is stored in a respective separate additive tank, wherein each respective separate additive tank is provided with a respective separate pump to which the third user interface is electrically connected; and wherein each pump fluidically leads to the third outlet conduit.

10. The faucet system of claim 1, wherein at least two of the first outlet conduit, the second outlet conduit, and the third outlet conduit lead to a spout of the faucet in a manner fluidically separated from each other.

11. The faucet system of claim 1, wherein the first outlet conduit, the second outlet conduit, and the third outlet conduit are at least partially extendible or displaceable relative to a body of the faucet.

12. The faucet system of claim 1, wherein the third user interface comprises a touch screen having a circular outer edge.

13. The faucet system of claim 1, wherein the rotatable selection knob is rotatable around a rotation axis for a plurality of selection possibilities, and wherein a current selection of the plurality of selection possibilities is displayed via the third user interface.

14. The faucet system of claim 12, wherein the third user interface is configured to communicate wirelessly with the at least one electrically operated pump.

15. The faucet system of claim 3, wherein the rotatable selection knob is arranged next to and on substantially a same height level as the third user interface.

16. The faucet system of claim 8, wherein the health additive comprises vitamins.

17. The faucet system of claim 10, wherein each of the first outlet conduit, the second outlet conduit, and the third outlet conduit lead to the spout of the faucet in a manner fluidically separated from each other.

18. The faucet system of claim 1, wherein each of the chilled water, the hot water, and the carbonized water is stored in a respective separate tank;

wherein at least two of the respective separate tanks are provided with a shared second valve to which the second user interface is electrically connected; and wherein the shared second valve fluidically leads to the second outlet conduit.

19. The faucet system of claim 1, wherein each liquid additive is stored in a respective separate additive tank, wherein at least two of the separate additive tanks are provided with a shared pump to which the third user interface is electrically connected; and wherein the shared pump fluidically leads to the third outlet conduit.

20. The faucet system of claim 1, wherein an axis perpendicularly intersects the base of the faucet at the second side and passes through the second user interface and the first user interface.

* * * * *